United States Patent
Korn et al.

(10) Patent No.: US 7,822,187 B2
(45) Date of Patent: Oct. 26, 2010

(54) TELEPHONE SYSTEM WITH EMERGENCY OVERRIDE FOR CALLER TO BYPASS TELEPHONE ANSWERING DEVICE AND CAUSE PHONE OF CALLED PARTY TO RING

(76) Inventors: Hayley Korn, 159 E. 69$^{th}$ St., New York, NY (US) 10021; Jon Korn, 159 E. 69$^{th}$ St., New York, NY (US) 10021

( * ) Notice: Subject to any disclaimer, the term of this patent is extended or adjusted under 35 U.S.C. 154(b) by 503 days.

(21) Appl. No.: 11/274,797

(22) Filed: Nov. 14, 2005

(65) Prior Publication Data

US 2006/0078105 A1    Apr. 13, 2006

Related U.S. Application Data

(63) Continuation-in-part of application No. 10/728,377, filed on Dec. 4, 2003, now abandoned, which is a continuation of application No. 09/248,436, filed on Feb. 11, 1999, now Pat. No. 6,917,680.

(51) Int. Cl.
H04M 3/42    (2006.01)
(52) U.S. Cl. .................................. 379/210.02
(58) Field of Classification Search ............ 379/210.02, 379/211.02
See application file for complete search history.

(56) References Cited

U.S. PATENT DOCUMENTS

| | | | |
|---|---|---|---|
| 3,784,721 A * | 1/1974 | Kilby | 379/74 |
| 4,384,171 A | 5/1983 | Klee | |
| 4,393,278 A * | 7/1983 | Miyoshi | 379/199 |
| 4,405,839 A | 9/1983 | Groff | |
| 4,446,334 A | 5/1984 | Groff | |
| 4,480,154 A | 10/1984 | Klee | |
| 4,791,664 A | 12/1988 | Lutz et al. | |
| 4,845,743 A | 7/1989 | Lutz | |
| 4,924,499 A | 5/1990 | Serby | |
| 5,131,030 A | 7/1992 | Cameron | |
| 5,191,607 A | 3/1993 | Meyers et al. | |
| 5,317,632 A | 5/1994 | Ellison | |
| 5,448,630 A | 9/1995 | Barstow | |
| 5,467,388 A | 11/1995 | Redd | |
| 5,604,797 A | 2/1997 | Adcock | |
| 5,651,055 A * | 7/1997 | Argade | 379/88.01 |
| 6,122,366 A | 9/2000 | Veschi | |
| 6,792,263 B1 * | 9/2004 | Kite | 455/412.1 |
| 2004/0076274 A1 * | 4/2004 | Anselmetti et al. | 379/88.22 |

FOREIGN PATENT DOCUMENTS

WO    WO 97/16932    5/1997

* cited by examiner

*Primary Examiner*—Alexander Jamal
(74) *Attorney, Agent, or Firm*—Abelman, Frayne & Schwab (57) ABSTRACT

A telephone system allowing a caller whose call is intercepted by a telephone answering machine (TAD) to hear an alternate outgoing message from the TAD with instructions allowing the caller, who feels his/her call is an emergency, to override the TAD and cause the user's phone to ring anyway. This invention being applicable to wired and cellular phones and to VoIP (Voice over Internet Protocol) and cable system phones.

15 Claims, 7 Drawing Sheets

TELEPHONE SYSTEM WITH EMERGENCY OVERRIDE FOR CALLER TO BYPASS TELEPHONE ANSWERING DEVICE AND CAUSE PHONE OF CALLED PARTY TO RING

RELATED APPLICATIONS

This application is a continuation-in-part application of applicants' application U.S. Ser. No. 10/728,377, filed Dec. 4, 2003, now abandoned, which is a continuation of applicants' Ser. No. 09/248,436, filed Feb. 11, 1999, now U.S. Pat. No. 6,917,680 on which priority is claimed.

BACKGROUND OF THE INVENTION

This invention is in the field of telephones of all types including conventional wired and wireless cellular phones and VoIP (Voice over Internet Protocol) phones, and more particularly to the combination of such phones with a telephone answering device (TAD) and/or other devices for receiving, monitoring and routing incoming calls.

FIELD OF THE INVENTION

Related Art

With ever expanding telephone usage, we are increasingly inundated with unwanted telephone calls. Anyone who has been startled awake at night by a "wrong number" knows that it is desirable for telephone subscribers to be able to disable the ringer mechanism of their telephones when they do not want to be disturbed. Thus, one could elect to disable a telephone's ringer while sleeping, eating, bathing, or simply while engaged in a quiet activity. Prior to modern modular telephone connections, the only method of silencing a telephone's ringer was to turn down the ringer's volume, or leave the receiver off of the hook. Now, one can simply disconnect the modular plug from the telephone itself or from the wall jack. With the telephone disconnected, the caller would hear a ring signal and assume the person called is not in, while the person called hears nothing.

There are, however, numerous problems associated with disconnecting a telephone's modular plug. First, this method requires the user to remember to employ the remedy. In addition, the user must also remember to reconnect the modular plug to reinstate telephone service. Thus, disabling a telephone's ringer via pulling its modular plug is subject to the same risks and problems that are associated with turning the ringer's volume down or leaving the receiver off the hook. People forget and, thus, receive calls at unwanted times or miss calls they are willing to receive. Over the years, people have attempted to solve the problems addressed by this invention in numerous ways. For example, timers have been used in combination with telephone silencers to disable a telephone for time periods when the user does not wish to be disturbed. Similarly, there are commercial devices available that have on-off switches that allow a telephone ringer to be enabled and disabled. However, these too require that the user remember to employ the remedy in order to avoid phone calls, and then remember to reactivate it when willing to receive calls. Consequently, there is a need for an apparatus that selectively enables and disables a telephone ringer.

SUMMARY OF THE INVENTION

The present invention provides an alternative to a conventional telephone answering device (TAD) which is normally operative when the user is away or unavailable or elects not to answer an incoming call such as at night when the user is sleeping and does not want to even hear the ring from an incoming call. Such a conventional TAD has an outgoing message (greeting) stating that the user is unavailable and that the caller may leave a message. The present invention allows the user to direct the TAD to play a different outgoing message stating that instead of leaving a message, the caller may, if he/she feels the call is an emergency, cause the user's phone to ring anyway.

Thus, the new invention gives the caller an option to "override" the normal greeting that merely allows a caller to leave a message, and now the caller can make the user's phone ring. After the user's phone rings, the user can pick-up and receive the call, or not pick-up and let the call proceed to the normal greeting which will accept a message.

This invention includes a variety of embodiments which may be applicable to standard wired phones, to wireless cellular phones, to cable systems and to VoIP (Voice over Internet Protocol) phones. Additional embodiments allow the "emergency override" feature to be activated manually, or by light sensitive or timing device, as further described below.

In one embodiment, the present invention includes a light sensing device operable to produce a signal indicative of a level of ambient light; and a controller operable to receive the signal and disable the telephone ringer when the signal indicates that the ambient light has reached a predetermined level.

According to another aspect of the present invention, an apparatus for disabling a telephone ringer includes a light sensing device operable to produce a first signal indicative of a level of ambient light; a timing device operable to produce a second signal indicative of a timing condition; and a controller operable to receive the first and second signals and disable the telephone ringer when either (i) the first signal indicates that the ambient light has reached a predetermined level, or (ii) the second signal indicates that a predetermined timing condition has been satisfied. According to a further aspect of the present invention, an apparatus for disabling a telephone ringer includes a light sensing device operable to produce a first signal indicative of a level of ambient light; a timing device operable to produce a second signal indicative of a timing condition; a controller operable to receive the first and second signals and disable the telephone ringer when either (i) the first signal indicates that the ambient light has reached a predetermined level, or (ii) the second signal indicates that a predetermined timing condition has been satisfied; and a recording device operable to communicate with the controller and play back a recording to a calling party. According to still another aspect of the present invention, an apparatus for disabling a telephone ringer includes a light sensing device operable to produce a first signal indicative of a level of ambient light; a timing device operable to produce a second signal indicative of a timing condition; a recording device operable to play back a recording to a calling party, the recording prompting the calling party to provide indicia that the call is a priority call; and a controller communicating with the light sensing device, the timing device and the recording device, the controller being operable to receive the first and second signals and both (i) disable the telephone ringer, and (ii) enable the recording device such that the recording device may play back the recording to the calling party, when either (i) the first signal indicates that the ambient light has reached a predetermined level, or (ii) the second signal indicates that a predetermined timing condition has been satisfied, the controller being operable to initiate an emergency sequence when the indicia indicates that the call is a priority call. Additional objects, features and advantages of the present invention will become apparent from the following description and the appended claims, taken in connection with the accompanying drawing.

BRIEF DESCRIPTION OF THE DRAWINGS

For the purpose of illustrating the invention, there are shown in the drawing forms which are presently preferred, it being understood, however, that the invention is not limited to the precise arrangements and instrumentalities shown.

DETAILED DESCRIPTION OF THE INVENTION

Figure 1:
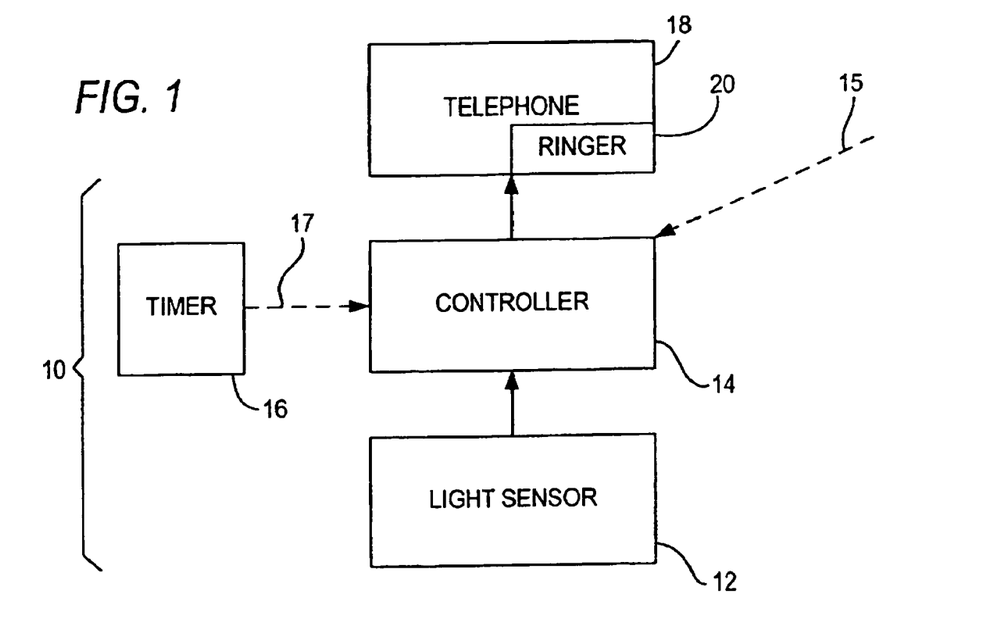
FIG. 1 is a block diagram of an apparatus for disabling a telephone ringer in accordance with at least one aspect the present invention.

Referring now to the drawings wherein like numerals indicate like elements, there is shown in FIG. 1 a first embodiment of the present invention. Apparatus 10 is a telephone controlling system which includes light sensor 12, controller 14 and timer 16 as shown. Both the light sensor 12 and timer 16 communicate with controller 14 which in turn serves to enable and disable ringer 20 of telephone 18.

While timer 16 is shown in this embodiment, it will be appreciated by those of ordinary skill in the art that timer 16 need not be included in apparatus 10. That is, apparatus 10 could merely consist of light sensor 12 and controller 14 in communication with telephone 18 and 15 ringer 20. Accordingly, connection 17 between timer 16 and controller 14 is shown as a dashed line.

Light sensor 12 may be a photovoltaic cell, a photo-transistor, a photo-resistor or other photosensitive component known in the art. As the level of 20 ambient light changes, light sensor 12 provides controller 14 with a first signal which changes in accordance with the level of ambient light. When the ambient light reaches a predetermined level (preferably falling below a predetermined level), controller 14 will recognize that light sensor 12 is sending a first signal indicating that the ringer 20 should be disabled. The controller 14 will preferably respond to the first signal by disabling ringer 20 of telephone 18.

Timer 16 may be a clock timer (such as a digital clock circuit) that provides a second signal to controller 14 indicative of a timing condition or set of conditions. For example, the second signal may be representative of periodic pre-set times at which the controller 14 should sequentially enable and disable ringer 20 of telephone 18. Alternatively, timer 16 may be a multi-day clock timer and provide a second signal to controller 14 indicating that at varying times on varying days the ringer 20 of telephone 18 should be enabled and disabled.

Figure 2:
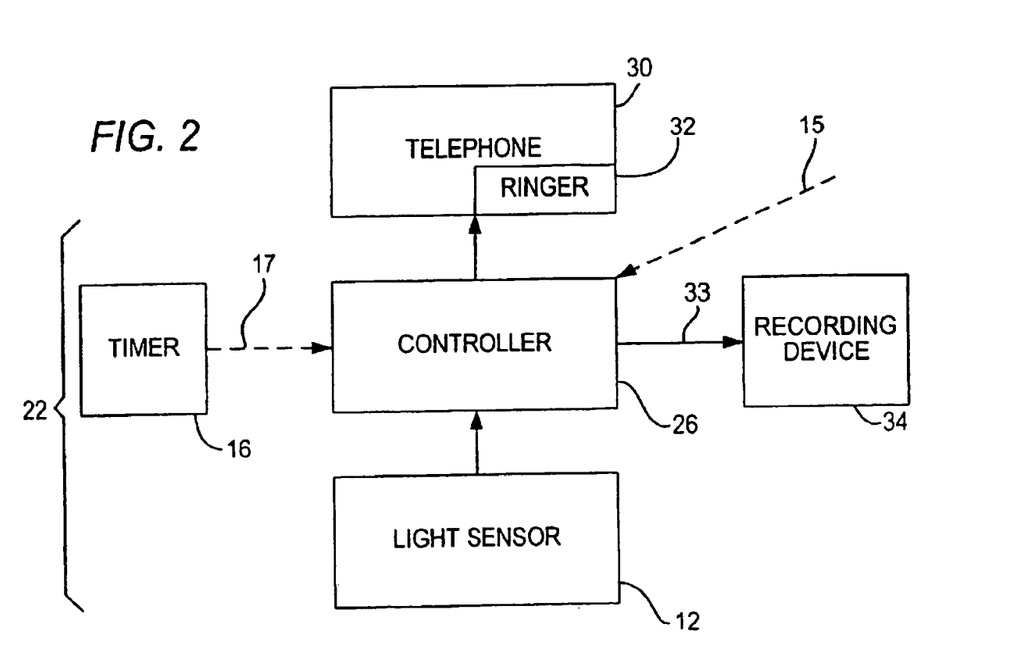
FIG. 2 is a block diagram of an apparatus for disabling a telephone ringer in accordance with another aspect of the present invention.

In apparatus 10, controller 14 will enable and disable ringer 20 of telephone 18 in response to a first signal from light sensor 12 and/or a second signal from timer 16. Those of ordinary skill in the art, however, will appreciate that controller 14 could be adapted in such a manner to be responsive only to the first signal from light sensor 12 or the second signal from timer 16. Another embodiment of the present invention is shown in FIG. 2 and includes light sensor 12 and timer 16 in communication with controller 26. Light sensor 12 may be a photovoltaic cell, a photo-transistor a photoresistor or other photo-sensitive component as discussed above with respect to apparatus 10. Timer 16 is preferably substantially the same as timer 16 of FIG. 1. Unlike apparatus 10 in FIG. 1, apparatus 22 of FIG. 2 includes a recording device 34. Recording device 34 may be in the form of an answering machine, answering service or the like. In the embodiment of the present invention shown in FIG. 2, controller 26 preferably disables ringer 32 of telephone 30 and enables recording device 34 (via signal line 33) to answer any incoming phone calls in response to a first signal from light sensor 12 and/or second signal from timer 16.

Figure 3:
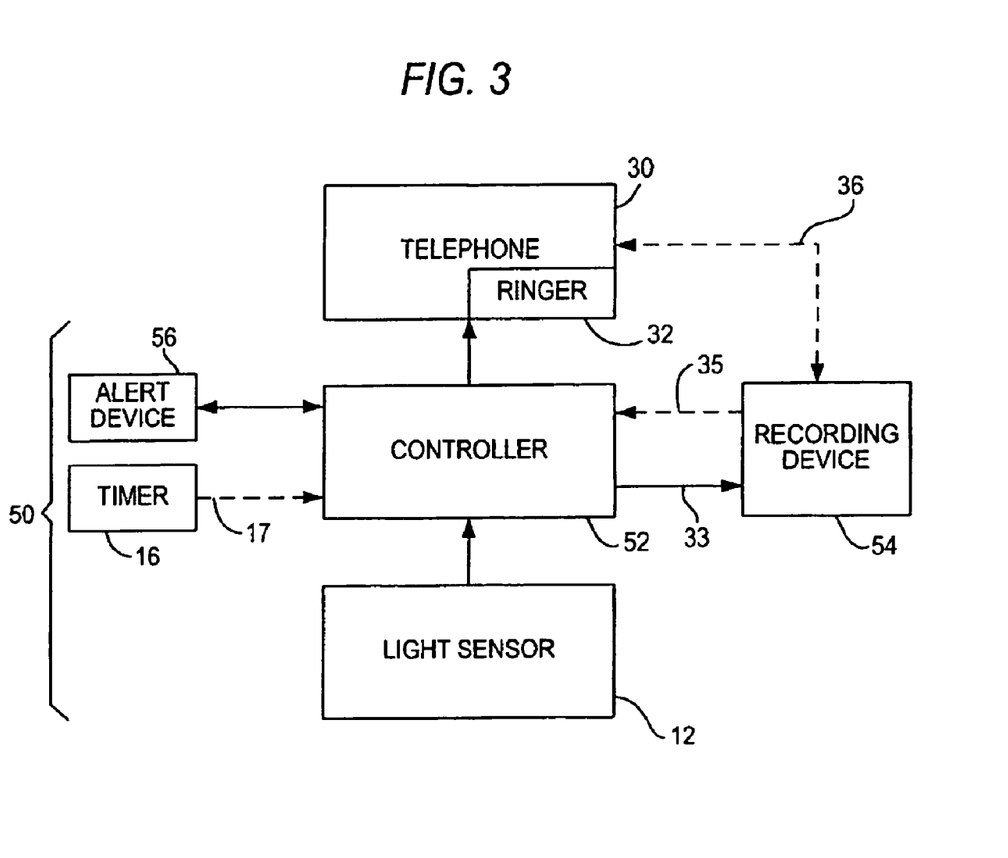
FIG. 3 is a block diagram of an apparatus for disabling a telephone ringer in accordance with yet another aspect of the present invention.

Preferably, recording device 34 is capable of playing back a recording to a calling party and is also capable of receiving and retaining a message from the calling party. Reference is now made to FIG. 3 which shows an alternative embodiment of the present invention designated as apparatus 50. Apparatus 50 is a telephone controlling system which includes light sensor 12, timer 16 and recording device 54 in communication with controller 52. Timer 16 and light sensor 12 are substantially similar to timers and light sensors, respectively, of the previous embodiments of the present invention. As was the case with the previous embodiments of the present invention, controller 52 operates to disable ringer 32 of telephone 30 in response to first and/or second signals from light sensor 12 and timer 16, respectively.

Recording device 54 is preferably operable to play back a recording to a calling party which states, in pertinent part, "if this is an emergency, press the asterisk '*' button." This recording is provided to controller 52 via signal line 35 and, thereafter, to the calling party over the telephone line (not shown). Therefore, the calling party 20 can opt to press the asterisk '*' button on his or her telephone handset to initiate an emergency sequence (or indicate that the call is a priority call). It is noted that the recording provided to the calling party may take on many forms as will be apparent to one skilled in the art from the above teaching. Further, one skilled in the art will recognize that it is not necessary to utilize the asterisk '*' button of the telephone as indicia that the emergency sequence should be initiated and that other means of initiating the emergency sequence are available (such as using other keypad buttons or sequences of keypad buttons).

Should the calling party choose to initiate the emergency sequence by pressing the '*' button on his or her keypad, the controller 52 may take one or more actions. In particular, the controller 52 may reactivate ringer 32 of telephone 30 such that telephone 30 rings and the user is alerted that an emergency telephone call is being received. Alternatively, (assuming the recording provided to the calling party also states that a message should be left by the calling party) controller 52 may activate recording device 54 to record the calling party's message and then terminate the calling party's connection to telephone 30. Thereafter, controller 52 may alert the user by other means, such as subsequently enabling ringer 32 or enabling an alert device 56 which indicates that an emergency call has been received. Alert device 56 may be a ringer, a light emitting device, or the like.

One skilled in the art will appreciate from the teaching herein that the controller 52 need not directly control recording device 54 if the recording device 54 is designed to automatically answer incoming calls irrespective of whether ringer 32 has been disabled by controller 52. Indeed, known answering machines may be coupled to a telephone line (not shown) which will answer incoming calls without input from controller 52. Generally, such answering machines (if used for recording device 54) may communicate with telephone 30 via its input jack as shown by dashed signal line 36. However, when controller 52 is in communication with telephone 30 via its input jack and recording device 54 is directly connected to the telephone line, then recording device 54 may communicate with controller 52 via signal line 35 such that telephone 30 may access the telephone line.

While the invention as discussed above is generally directed to an apparatus that may by inserted between an input of a telephone (e.g., the input jack to the telephone) and the telephone line (e.g. a modular plug coming from the ring/tip connections of the telephone line), those of ordinary skill in the art will 5 appreciate that the present invention may be used in conjunction with a number of appliances. Indeed, the invention can be incorporated into a telephone answering machine, as well as alarm clocks, and other devices. A complete telephone can even be constructed that contains the invention internally (e.g., integrally). In addition, the invention could also be inserted immediately after the interface of one's incoming phone service in order to control all of the phones in a house or office. Further, one skilled in the art will recognize that timers 16, 16 may be integral to respective controllers 14, 26, 52.

Figure 4:
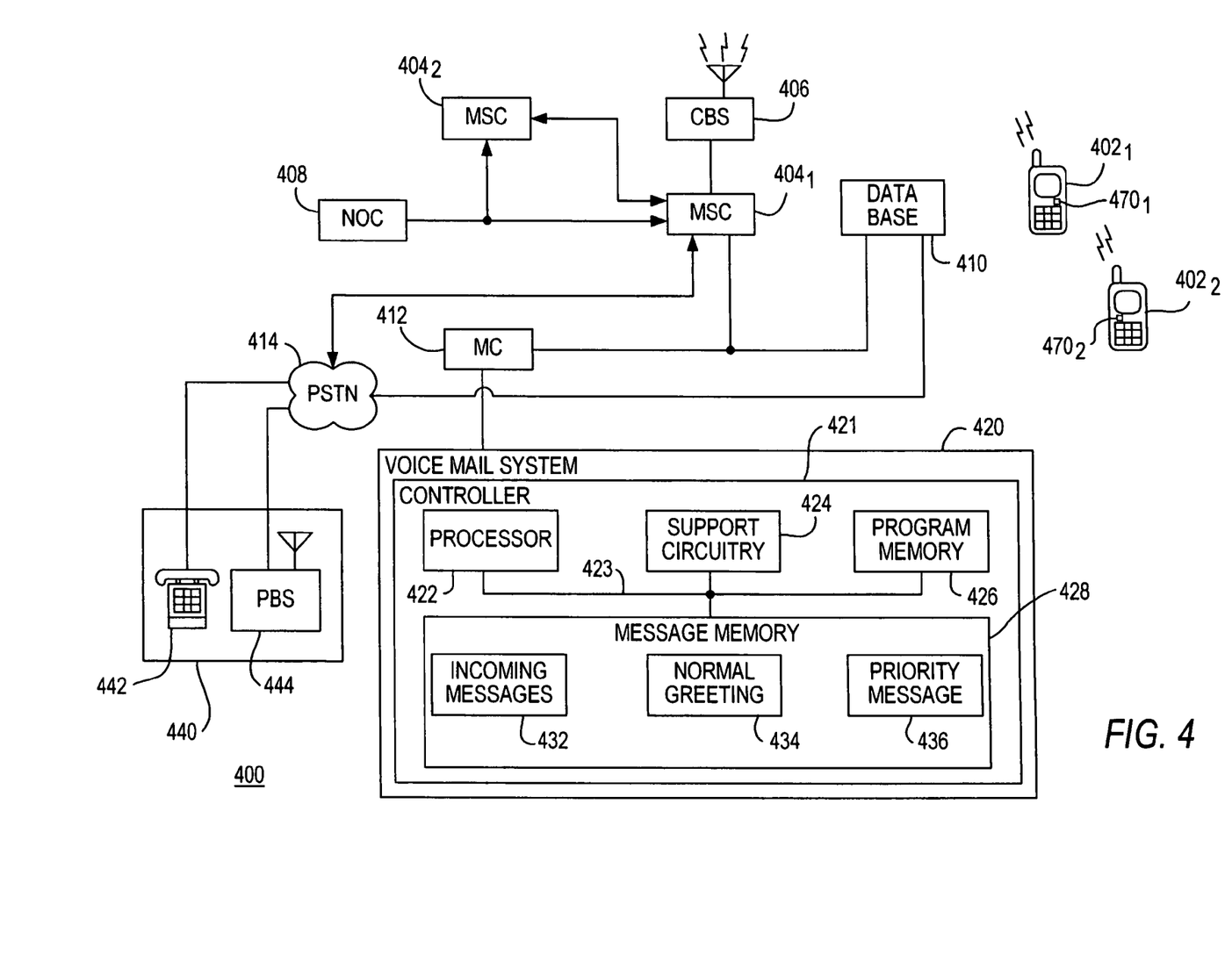
FIG. 4 is simplified block diagram of a cellular phone switching system, its logical entities as well as its relative connection with the public switched telephone network, and a voice mail system operatively connected for communication with the cellular network for controlling a priority call alert associated with receiving a priority call.
Figure 5A:
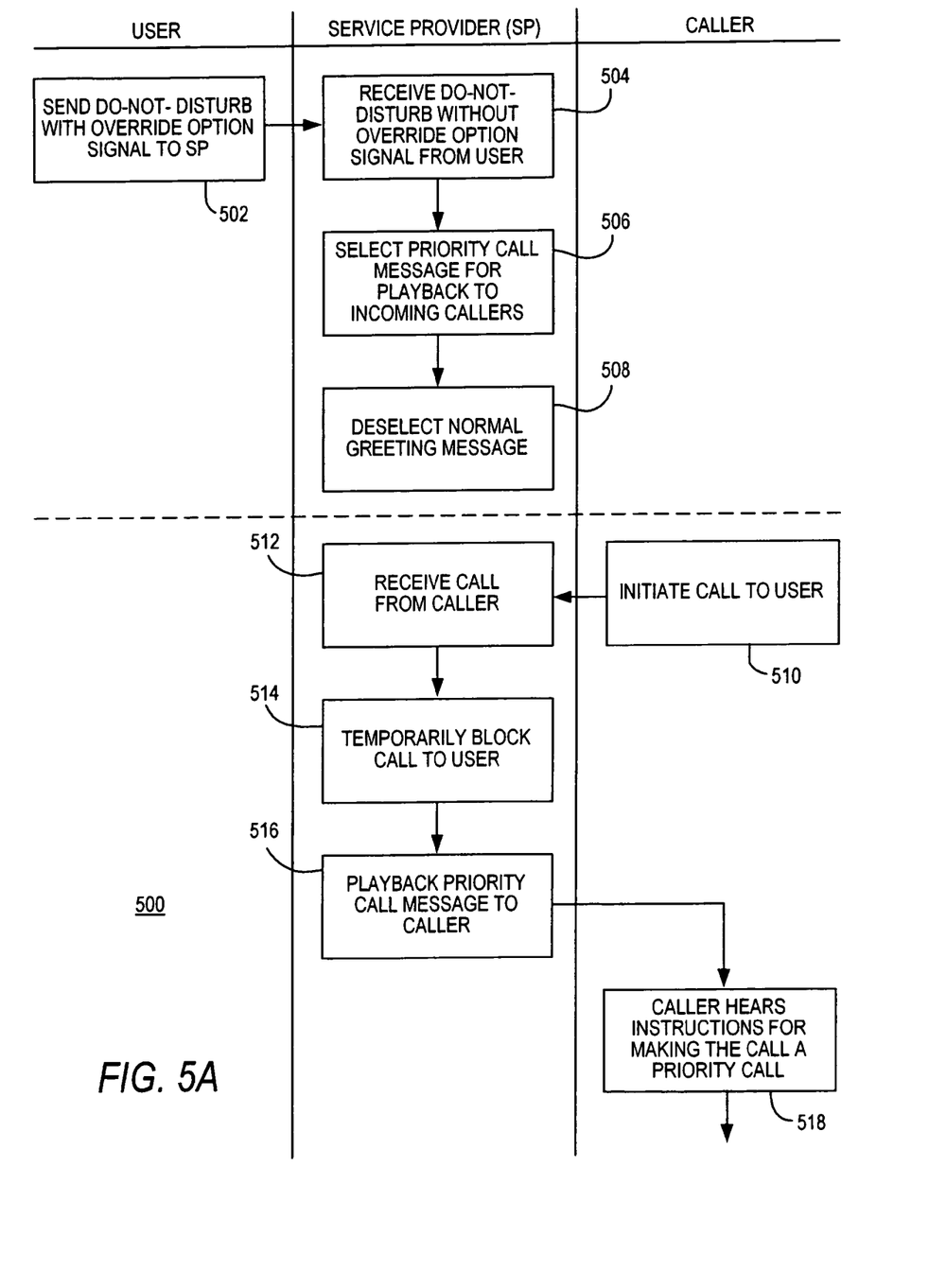
FIGS. 5A-5C collectively shows a high level flow diagram depicting one example of the invention in operation.
Figure 5B:
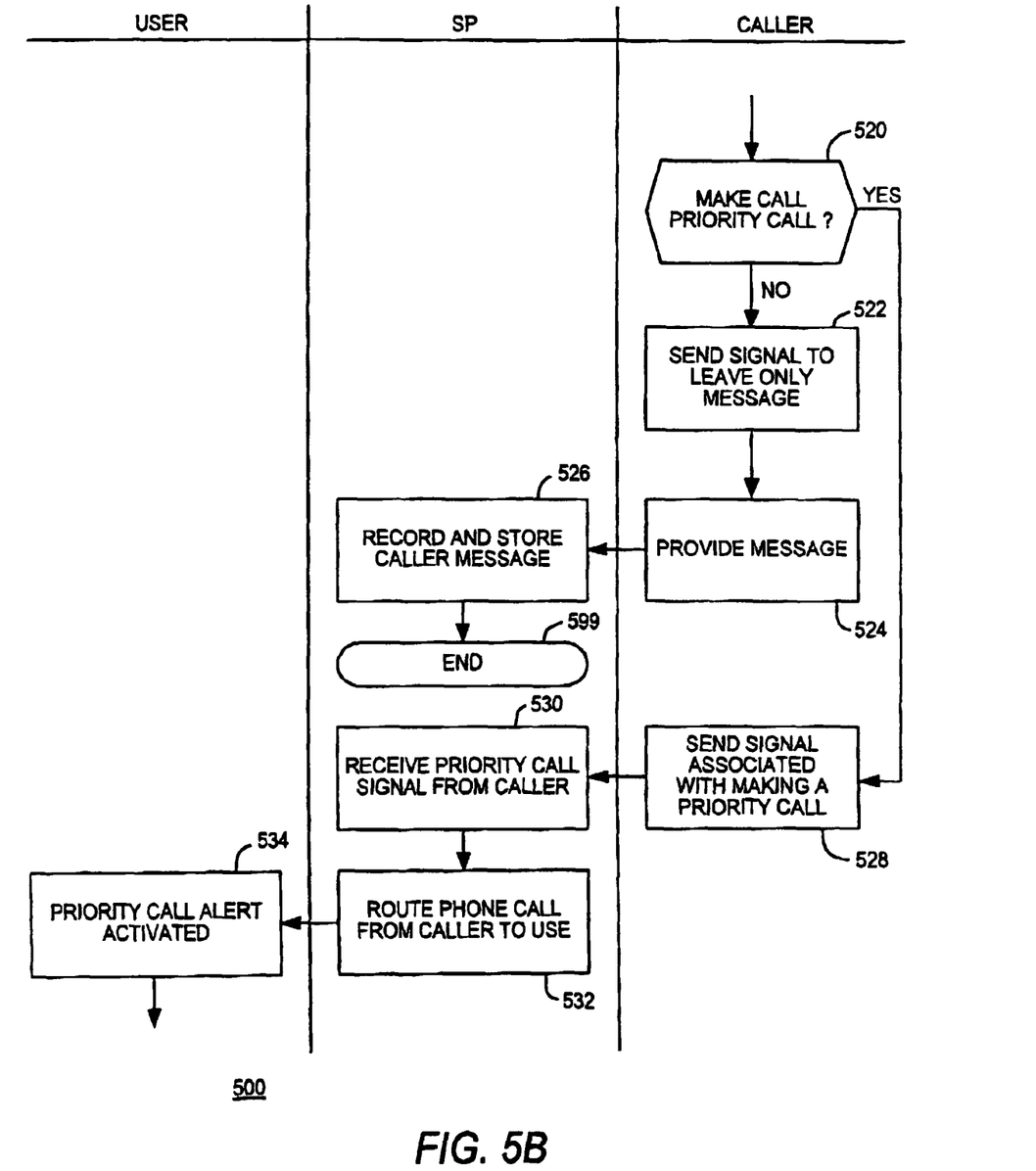
Figure 5C:
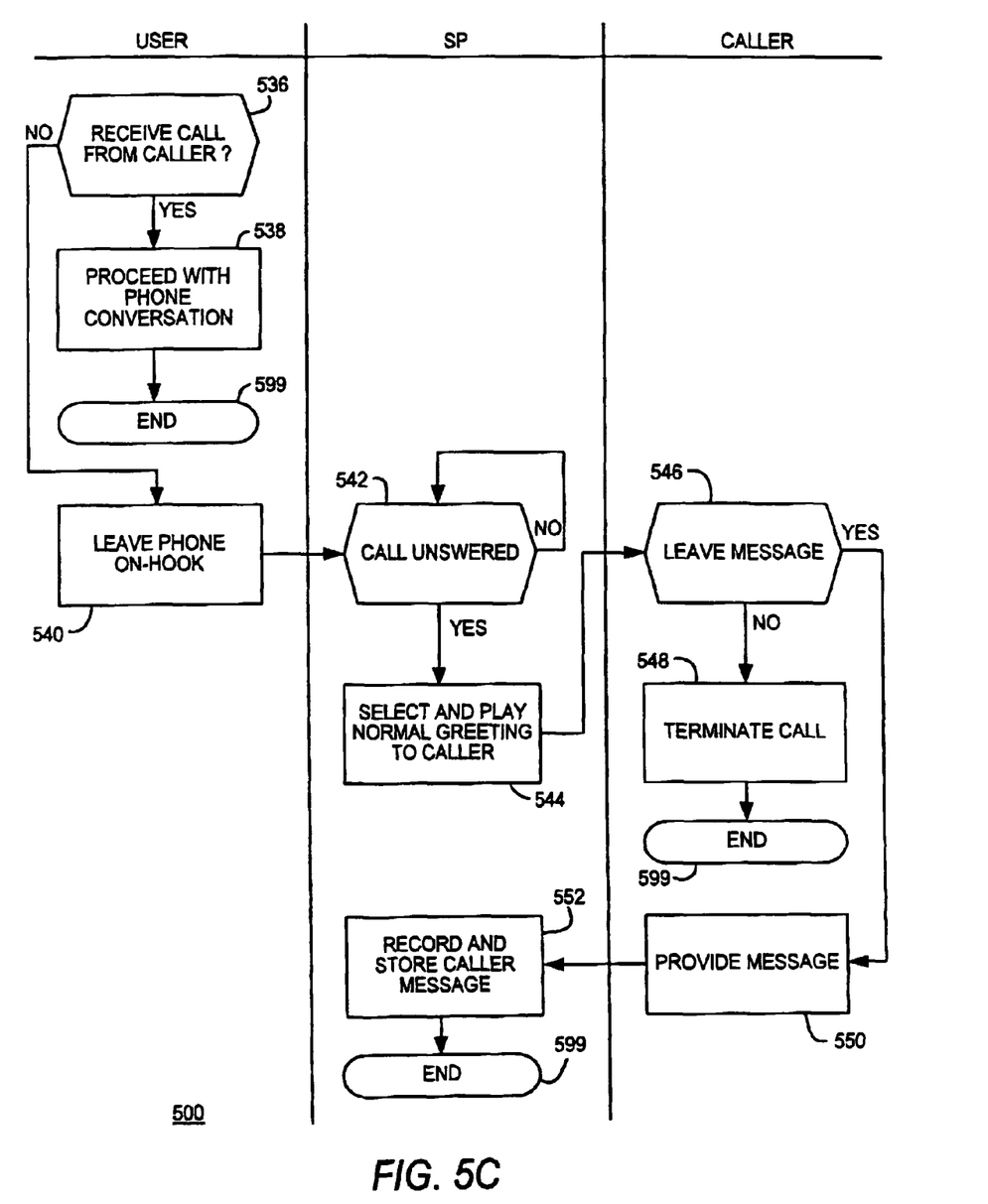
Figure 6:
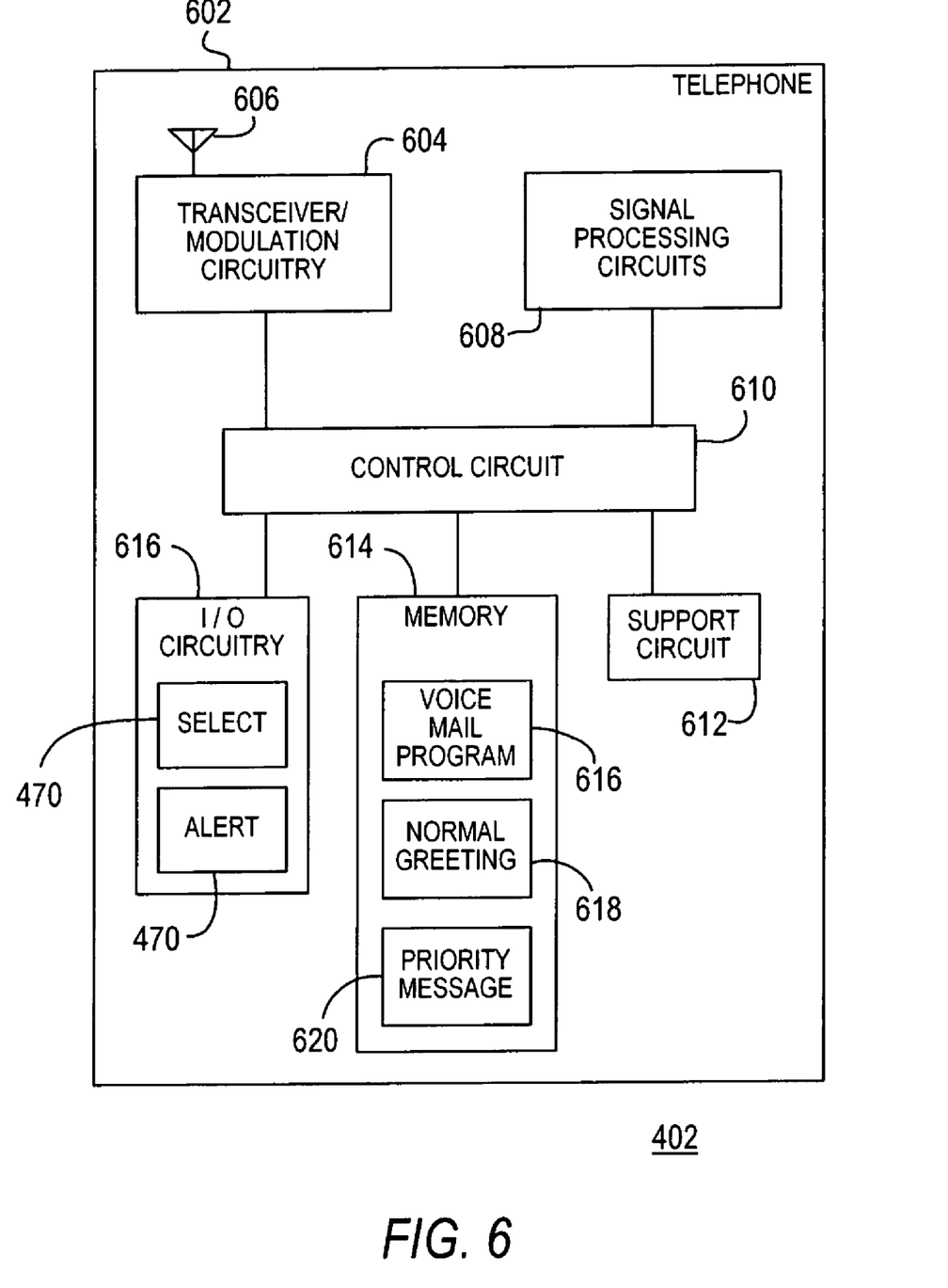
FIG. 6 is a block diagram illustrating an embodiment of a mobile station according to the present invention.

As seen illustrated in FIGS. 4-6, this further embodiment of the present invention provides a method and apparatus for allowing a person to temporarily disable or block the receipt of incoming calls, but allow the caller to override the blocking feature by designating the call as a priority call. Thus, the user can change the normal mode of operation of his/her phone to a "do not disturb" mode of operation (also called "emergency override" mode), such that only incoming calls designated as priority or emergency calls are forwarded to the user (i.e., called party). Other incoming calls not designated as priority calls (i.e., non-priority calls) are sent to standard voice mail for retrieval by the called party at a later time.

In particular, the present invention allows a user, who is a subscriber for wireless services with a carrier, such as a common cellular phone service, to send a signal (i.e., notification message) to the voice mail system associated with the service provider (e.g. a wireless communications service provider), to intercept all incoming calls and present a particular voice mail message that presents the caller with an option of making the current call a priority call. If the caller designates the call as a "priority call," then the priority call is forwarded as an incoming priority call to the called party. Otherwise, if the caller does not designate the call as a priority call, the voice mail system allows the caller to leave a voice mail message or to terminate the call in a conventional manner.

Referring to FIG. 4, there is shown a simplified block diagram of a cellular phone switching system forming part of a wireless cellular phone network 400, its logical entities, as well as the relative connection with the public switched telephone network 414, and a private base station 444.

The present invention allows a subscriber for phone services to transmit a packetized mode of operation signal, such as:

(a) a do-not-disturb message (i.e., voice mail notification), or (b) a normal mode of operation signal, to the messaging center 412 of the service provider. This voice mail notification is forwarded to a voice mail system 420 of the service provider. The packetized information initiates a routine that is performed by the voice mail system in conjunction with other components in the network 400 to block any incoming phone calls to the subscriber, unless the caller designates the call as a priority call.

The network 400 includes a plurality of mobile wireless devices, such as for example, the cellular telephone $402_1$ belonging to a subscriber of the voice mail system, and the caller's cellular telephone $402_2$. Other wireless devices could also be used, including one and two-way wireless pagers. Obviously, the caller's phone could be a cellular or land-line phone. The cellular concept is well known and is described in general in the Bell System Technical Journal, Volume 58, Number 1, January 1979, and specifically in an article entitled The Cellular Concept by V. H. MacDonald, the disclosure of which is hereby incorporated by reference.

In one embodiment a cell phone is provided with at least one selector, such as button or switch $470_1$ or $470_2$ as shown with respect to phones $402_1$ and $402_2$, respectively, for selection of a mode of operation, such as:

(a) a normal mode of operation, and (b) a call-blocking (i.e., do-not-disturb) mode of operation. The circuitry of the cellular telephone is described in greater detail below with respect to FIG. 6. The phone 402 operates in the normal mode of operation by default, and the button 470 allows a user to send a signal to the service provider to switch back and forth between the call-blocking mode operation and the normal mode of operation. Both of these operational modes are discussed below in further detail with respect to FIGS. 5A-5C.

Included within the cellular switching system is at least one mobile switching center (MSC) $404_1$, and (MSC) $404_2$, the public telephone switched network (PSTN) 414, a cellular base station (CBS) 406, and one or more databases 410. An optional private base station (PBS) 444 can be used at a premise 440, such as a residence, and is connected to the wireless network via the PSTN 414. A subscriber station telephone set 442 is also illustratively shown connected to the public telephone switched network 414 in a well known manner. In this particular example, the private base station 444 is illustrated as part of the residential premises.

A mobile station, such as a cellular phone $402_1$ or $402_2$ (collectively cellular phones 402), is illustratively shown outside the premises 440. A messaging center (MC) 412 is connected to a voice mail system (VMS) 420, the databases 410, and all Mobile Switching Centers 404 in the network 400 via a Signaling System such as a standard SS7, which is a separate system but may be integral to the cellular network. Although a private base station 444 and telephone set 442 are not essential for practicing the invention, these components are included for the sake of better understanding the applicability of the invention.

The databases 410 include a home location register (HLR), a visiting location register (VLR), and a private visiting location register (P-VLR), (these three registers not shown in FIG. 4) which are used to store profile records, authentication information, routing information for a particular area, and other information in a manner well known in the art. For a better understanding of the registers and their interaction with the cellular system 400, the reader is directed to U.S. Pat. No. 6,418,307, the contents of which are hereby incorporated by reference.

For clarity, the mobile switching center $404_1$ is illustratively shown connected to at least one other mobile switching center 404₂ and network operation controller (NOC) 408. The mobile switching centers 404 are part of the overall cellular systems operation and may similarly have as its database 410 a home location register (HLR), a visiting location register (VLR), and a private visiting location register (P-VLR), as well as multiple cellular base stations 406 associated therewith. It is understood that other mobile switching centers also may be part of the cellular system. The network operation controller (NOC) 408 provides overall control, and thereby ensures that the operation of the entire cellular system is supported and serviced.

The mobile switching center 404 performs all the switching functions related to call delivery and is interconnected to the public telephone switched network 414, the databases (i.e., location registers) 410, and to the cellular base station 406. The mobile station (or cellular phone 402) and cellular base station 406 are designed to operate in a cellular system in accordance with the Telecommunications Industry Association (TIA) Interim Standard (IS)-136, dated December 1994, the content of which is hereby incorporated by reference.

The voice mail system 420 is operatively in communication with the mobile switching center 404, the location registers stored in the databases 410, and the messaging center 412. The voice mail system 420 can be a separate system apart from the public switched telephone network 414, part of the public switched telephone network, or integral with the cellular telephone network 400.

As shown in FIG. 4, the voice mail system 420 includes at least one controller 421 that is suitable for controlling operations for the voice mail system. Specifically, the controller 421 comprises a processor 422, as well as memory 426 for storing various control programs and routines to implement the present invention. Although the controller 421 is shown and discussed as being an integral component of the voice mail system 420, one skilled in the art will appreciate, that the controller 421 can be facilitated on an independent computer device, such as a server or workstation, and need only be in communication with the voice mail system 420 to select the appropriate voice mail messages.

Memory 428 is also provided for storing messages, such as incoming messages 432, outgoing greeting messages 434, and outgoing priority messages 436 of the present invention. Incoming messages refers to messages recorded by a caller that are stored in the memory 432 for later retrieval by the subscriber (called party). An outgoing greeting message refers to a conventional or personalized greeting prerecorded by the subscriber that is played to a caller in response the called party/subscriber not answering the incoming call. For example, the greeting message may state in part that "the party you called is unavailable, please leave a message after the tone." The greeting message can be recorded by the subscriber or the service provider, and is stored in the memory 434 for playback in a conventional manner.

The outgoing "priority" message refers to a message stored in memory 436 that provides instructions for a caller to make his current call a "priority call" or "emergency override call", as discussed below in greater detail with respect to FIGS. 5A-5C. For purposes of describing the invention, a priority call and emergency call or emergency override are treated equivalently. For example, the priority message may state in part, for example, that "if this is an emergency, please press the asterisk (*) button on your phone to alert the called party that this is a priority call" or the message may state in part, for example, "if this is an emergency please press the asterisk (*) button which will override the automatic outgoing greeting and cause the phone of the called party to ring". One skilled in the art will appreciate that the normal greeting and priority greeting can be any suitable message for the purposes stated herein.

The processor 422 may be any conventional processor, such as one or more Intel® processors. The processor 422 cooperates with support circuitry 424, such as power supplies, clock circuits, I/O circuitry, cache memory, among other conventional support circuitry, to assist in executing the software routines illustratively stored in the memory 426.

The memories 426 and 428 may comprise volatile memory (e.g., RAM), non-volatile memory (e.g., disk drives) and/or a combination thereof. Although the memory is shown as two separate memory devices, one skilled in the art will appreciate that the memory may be provided on one or more memory devices.

As such, it is contemplated that some of the process steps discussed herein as software processes may be implemented within hardware, for example, as circuitry that cooperates with the processor 422 to perform various steps. It is noted that an operating system (not shown) and optionally various application programs (not shown) can be stored in the memory 126 to run other specific tasks and enable user interaction.

Although the controller 421 of FIG. 4 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware or a combination thereof.

The subscriber for cellular telephone services can operate the phone in at least two modes. The first mode is a normal or conventional mode of operation. When a calling party makes a call to a subscriber of the voice mail system 420, and the subscriber does not answer, the mobile switching center 404 can switch the call over to the voice mail system 420, which activates a request for the calling party to leave a message in the subscriber's mailbox 432. Thus the caller records a message for the called party, which is stored in a portion of memory designated for incoming messages 432.

The second mode of operation is termed a "do-not-disturb" mode of operation or "emergency override", where the subscriber for cellular services sends a signal to the service provider to switch over from using the normal or standard greeting stored in memory 434 to the priority message stored in 436. In this second mode of operation, the voice mail system 420 will select from memory 436, the priority message for playback to a caller. The priority message can be recorded and stored in memory 436 by the subscriber or the service provider.

Referring to FIGS. 5A-5C, a flow diagram is shown illustrating a method 500 for using the voice mail service, which includes the "do-not-disturb" and priority call override features of the present invention. The flow diagram includes three columns that describe the steps and interactions between the user (subscriber), the service provider (SP), and the caller (calling party).

The method 500 starts at step 502 (FIG. 5A), where a subscriber of the cellular phone services (i.e., user) has his/her cell phone in the default normal mode of operation, and sends a signal (presses button 470) from this cell phone to the service provider to initiate the "do-not-disturb" mode of operation. In particular, the user may desire to not be disturbed for a specified time period by incoming phone calls, unless the incoming phone call is from a person who deems it a priority call, such as an emergency situation or some other important circumstance to warrant the calling party to override the do-not-disturb mode of operation by making the call a priority call.

The do-not-disturb mode of operation is telephone specific, meaning that this do-not-disturb mode of operation is initiated and applicable for the phone from which the signal is sent to the service provider. The do-not-disturb signal initiates a sequence of steps by the service provider, as described below: (a) to temporarily block an incoming call, (b) forward the incoming call to voice mail, and present the caller with the option of either: (1) making the call a "priority call" to unblock the call and have it routed to the called party, or (2) leaving a message in a conventional manner.

At step 504, the service provider receives the "do-not-disturb with override option" signal from a user. In particular, the packetized signal is carried by the local base station 406 and sent to the MSC (router) 404, where it is routed to the message center 412. The message center 412 sends the packet information of the signal to the controller 421, where the packetized information is stored in memory (e.g., cache) and executed by the processor 422 in a well known manner.

At step 506 the controller 421 instructs the voice mail system 420 to select the "priority call message" 436 for playback to callers making incoming priority calls to the subscriber. At step 508, the controller 421 discontinues using the normal greeting message stored in memory 434 which is normally used for playback. Thus, the do-not-disturb signal switches the voice mail system 420 from the standard mode of operation (where it allows the forwarding of all incoming calls and plays the normal greeting stored in memory 434 in response to an unanswered call) to the do-not-disturb mode of operation. The method 500 then proceeds to step 510.

At step 510 a caller makes a call to the subscriber who has previously initiated the do-not-disturb mode of operation on his/her phone. The caller can make the call from any phone at any location that has connectivity to the network 400, such as from a phone 442 connected to a land line, a cellular phone 402, a PDA, a laptop having VoIP capabilities and the like.

At step 512 the MSC 404 receives the incoming call and routs the call to the message center 412. At step 514, the service provider temporarily blocks the incoming call from being routed to the called party. In one embodiment the message center 412 sends a message to the MSC 404 to instruct the MSC not to rout the call to the called party. Optionally, the MSC 404 provides an acknowledgement message back to the message center 412.

At step 516 the message center 412 communicates with the voice mail system 420 via the controller 421 to play back the priority message that is stored in memory 436 to the caller. At step 518 the caller receives the message containing instructions on how to make the current call a priority call. The method 500 then proceeds to step 520 (FIG. 5B).

At step 520 the priority message gives the caller the option of:
 (a) not making this call a priority call and merely leaving a message,
 (b) making the current call a priority call, leaving a message, or
 (c) terminating the call by hanging up.

If, at step 520 the caller elects option (a) and sends a signal to leave a voice mail message, then the method proceeds to step 522, where the caller presses the appropriate button on the phone to instruct the message center 412 that the caller wishes to leave a message. Thereafter, at step 524, the caller can communicate a personalized message, which at step 526, is received by the voice mail system 420 and recorded as an incoming message in memory 432 in a well known manner. The method 500 then proceeds to step 599, where the method ends.

If, at step 520, the caller elects option (b) and decides to make the current call a priority call, the method proceeds to step 528. At step 528 the caller sends a signal associated with making the current call a priority call. In one embodiment the caller presses a button, such as the asterisk (*) button, which sends the priority call signal (i.e., tone) to the message center 412. At step 530, the message center 412 receives the priority call signal, and the message center sends a message to the MSC 404 to rout the current (now priority) call to the called party (i.e., the subscriber).

At step 534 the priority call is routed to the subscriber in a conventional manner and an incoming call alert device is activated. The call alert device can be an audible device, such as the phone ringer or tones, a vibrator mechanism of the phone, an illumination device, a text message or any combination thereof.

At step 536 (FIG. 5C) the subscriber (called party) decides whether to answer the incoming priority call. If the called party decides to answer the phone call, the method 500 proceeds to step 538, where the called party responds to the alert device and answers the phone in a conventional manner. The two parties can then proceed to converse with each other in a conventional manner, until at step 599, the phone call is terminated.

If at step 536 the called party decides not to answer the incoming priority call, the method 500 proceeds to step 540 where the called party does not respond to the alert device and the phone remains on-hook. At step 542 the MSC (mobile switching center) continues to forward the call until the unanswered call "times out." That is, the incoming call is considered to have "timed out" after some predetermined metric has elapsed, "metric" meaning a predetermined time having elapsed or a predetermined number of rings having occurred on the user's phone. At step 544 the controller 421 instructs the voice mail system 420 to select and play the normal greeting message from memory 434, which instructs the caller to leave a message (e.g., recorded message) in a conventional manner. The normal greeting message is played only to this particular caller, since the called party did not answer the priority call. Recall, that the user has not switched from the do-not-disturb mode of operation back to the normal mode of operation. Thus, the priority call message will be played to any other caller making a call to the subscriber.

At step 546 the calling party receives the normal greeting and must decide whether to leave a message. If the calling party decides not to leave the message, the caller can terminate the call at step 548, and the method 500 proceeds to step 599 where the message ends. Otherwise, the method 500 proceeds to step 550, where the caller communicates a message to the voice mail system 420. At step 552 the voice mail system 420 records the caller's message and stores it in memory 432 for retrieval and playback by the subscriber at a later time. The subscriber can subsequently change the telephone mode of operation back to the normal mode of operation by sending the operation mode signal to the message center 412, as discussed above.

In another embodiment where the subscriber has a "caller ID" feature, the present invention allows the subscriber to input the phone number of one or more prospective callers to the "do-not-disturb" mode of operation. The system will then forward only those callers the user has selected as priority callers. Furthermore, the subscriber can program the system using "caller ID" to recognize particular callers with whom the subscriber does not wish to speak and to not offer them the option of "emergency override".

In particular, the subscriber's profile database stored at database 410 can include a link to a database that lists caller numbers and/or names that the subscriber deems as being acceptable for making a priority call. The subscriber can update this list of persons/phone numbers in a conventional manner as updating the subscriber's phone directory.

For those numbers/entities that are designated with priority status, any incoming call from one of such numbers/entities is automatically forwarded to the subscriber, regardless of which mode of operation the subscriber has selected. In other words, the priority caller does not have to listen to the outgoing priority call message from the voice mail system 420. Rather, the MSC 404 checks the database 410 for indication of priority call status for the caller. If the caller has been designated having priority status by the subscriber, the MSC 404 routs the incoming call to the subscriber in a conventional matter.

In one embodiment where the caller making the incoming call has not been designated with priority status by the subscriber, the incoming call is treated in a manner discussed above with respect to FIGS. 5A-5C. In an alternative embodiment, the incoming call can be sent to the voice mail system 420 and the caller is presented with the normal outgoing message, without an opportunity to make the caller's call a priority call. This latter embodiment advantageously allows the subscriber to block calls that the subscriber deems as usually being undesirable to answer.

Although the present invention is described in terms of being implemented in a wireless network, such as a cellular phone network, those persons skilled in the art will appreciate that the embodiments including the do-not-disturb mode of operation of the present invention are also applicable to VoIP telephone services occurring over the Internet (Voice over Internet Protocol) or any other communication networks that provides phone services.

FIG. 6 is a block diagram illustrating an embodiment of a mobile station 402 according to the present invention. In one embodiment, the mobile station 402 is a cellular telephone, however, those skilled in the art will appreciate that the mobile device can be any communication device capable of transmitting and receiving telephone calls.

The mobile station 402 comprises a housing 602 for facilitating a transmitter/receiver/modulation circuitry 604, an antenna 606, signal processing circuitry 608, a control circuitry (controller) 610, support circuitry 612, memory 614, and I/O circuitry 616, as is well known in the art. A radio communication signal sent from a base station 406 is inputted to the radio transmitter/receiver circuit 604 through the antenna 606. The received radio communication signal is converted to an intermediate frequency signal in the radio transmitter/receiver circuitry 604. Then, the received intermediate frequency signal is demodulated to a digital signal by a digital modulator/demodulator circuit. The demodulated digital signal is sent to the signal processing circuitry 608 where the digital signal is decoded by an error correcting encoder/decoder circuit, as conventionally known in the art. Digital signals decoded by and outputted from the error correcting encoder/decoder circuit include a digital communication signal and a digital control signal, where the digital control signal is supplied to and identified by control circuit 610. The digital communication signal, in turn, is decoded by a speech coding encoder/decoder circuit to restore an analog communication signal, which is subsequently outputted from an audio output device, such as a speaker.

On the other hand, outgoing speech is first transduced to a transmission signal by a transducer, and the transmission signal is then converted to a digital transmission signal by the speech coding encoder/decoder circuit. The digital transmission signal, after being encoded in the error correcting encoder/decoder circuit together with a digital control signal generated in the control circuit 610, is inputted to the digital modulator/demodulator circuit and modulated to an orthogonally modulated signal therein. The modulated signal is transmitted to the base station 406 from the antenna 606 after being converted to a high frequency signal by the radio transmitter/receiver circuit 604 for transmission through a predetermined radio channel, as is well known in the art.

The control circuit 610, which employs a microcomputer as a main control unit, interfaces with the transceiver/modulation circuitry 604, signal processing circuitry 608, the support circuitry 612, memory 614 and I/O circuitry 616 in a conventional manner. The support circuitry 612 include a battery power supply to provide electrical power required by the mobile station, GPS circuitry and other support circuitry conventionally known in the art. The support circuitry 612 operates in conjunction with the controller 610 in a well known manner. The I/O circuitry 616 includes circuitry for operating a display panel, speakers, jacks, keyboard, selector buttons and switches, among other conventionally known input and output devices. The I/O circuitry operates in conjunction with the controller 610 in a well known manner.

In a preferred embodiment the I/O circuitry includes a mode of operation selector which can be any conventional button or switch 470 that allows the user to manually switch between: (a) the normal mode of operation, which is the default mode of operation of the mobile station, and (b) the call blocking or "do-not-disturb" mode of operation.

In operation, a user selects a mode of operation by pressing the button 470, which provides an input signal to the control circuit 610 to send a mode of operation signal to the service provider. The control circuit 610 retrieves from memory the information required to notify the service provider that the subscriber's phone is operating in a particular mode of operation. The control circuit 610 transmits the mode of operation signal to the service provider, and more specifically, to the base station 406 and MSC 404 a conventional manner, as described above. In response to receiving the mode of operation signal from a subscriber, the controller 421 changes the outgoing message to correspond with the user is selected mode of operation.

For example, if the subscriber selects the "call blocking and emergency override" mode of operation, then, as seen in FIG. 4, controller 421 located at the service provider instructs the voice mail system 420 to select the priority message 436 for playback to incoming callers. Similarly, the subscriber can use the selector 470 to instruct the service provider to operate in the normal (default) mode of operation, in which the normal greeting message 434 is provided for playback to incoming callers, as described above with respect to FIGS. 4 and 5A-5C.

In another embodiment the mobile station (such as a cellular phone) 402 can store the voicemail program 616, normal greeting 618 and priority message 620 in the memory 614 of the mobile station. In this embodiment a user presses the mode of operation selector (e.g., button) 470 to switch from normal mode of operation to the do-not-disturb mode of operation. In contrast to step 504 of FIG. 5A, the mobile station does not send a signal to the MSC 404 of the service provider. Rather, the selection of the do-not-disturb mode of operation turns off the incoming call alert device (e.g., ringer, vibrator, and/or the like) 622 of the mobile station 402. That is, the incoming call alert devices 622 are disabled in response to the user selecting the do-not-disturb mode of operation.

When an incoming call is made by a calling party, the service provider routs the telephone call to the user in a conventional manner. The mobile station 402 will receive the incoming call, and the control circuitry 610 executes the voicemail program 616 to select the appropriate greeting message from memory 614. That is, the priority message 620 is retrieved from memory for playback to the incoming caller via the signal processing circuitry 608 and the transceiver/ modulation circuitry 604 in a conventional manner.

The caller then is given instructions by the priority message:

(a) to designate the incoming call a priority call,
(b) to leave a message, or
(c) to terminate the call, as discussed above with respect to method 500 of FIGS. 5A-5C. If the caller designates the incoming call as a priority call, then the controller 610 receives a signal from the caller's telephone, for example, by the caller pressing the asterisk button, which activates the alert device 622 into an ON-state. The called party can then answer the incoming priority call in a conventional manner.

If the caller does not send a priority signal back to the called party's mobile station 402, then the incoming call alert device 622 remains off, and the caller can leave a message in a conventional manner. One skilled in the art will appreciate that the incoming message from the caller can be stored at the voicemail system 420 of the service provider or in the memory 614 of the mobile station 402.

Although the embodiments of the present invention are discussed in terms of a wireless carrier, such as a cellular telephone service provider, one skilled in the art will appreciate that the service provider can be any telecommunications service provider, such as a cable service provider, an internet service provider, or any other telecommunications service provider that can transfer data and/or voice signals between a source node and a destination node.

The foregoing description of the preferred embodiments of the present invention have been provided for the purpose of illustration and description. They are not intended to be exhaustive or to limit the invention to the precise forms disclosed. Many modifications and variations are possible in light of the above teaching. It is intended that the scope of the invention be limited not by this detailed description, but rather by the claims appended hereto.

The invention claimed is:

1. An apparatus for prioritizing incoming telephone calls for a subscriber to a carrier providing telephone service over a network including at least one router for routing packetized telephone calls to a phone of the subscriber over the network, said subscriber's phone including a call alert device, said apparatus comprising:

a. a voice mail system communicating with said router (1) for storing incoming messages for the subscriber from callers calling the phone of the subscriber, and (2) for storing outgoing greetings from the subscriber to be played to callers to said subscriber, said outgoing greetings including a normal greeting instructing how to leave a message and a "priority call" greeting, and b. a controller communicating with said router and said voice mail system, said controller operable to direct said voice: mail system to operate in (i) call block mode to intercept incoming calls to the phone of the subscriber and record callers' messages, or (ii) call priority mode to allow callers, without qualifying said callers to receive said priority call message, to override said call block mode and activate the call alert device of the subscriber's phone, c. said controller operable in response to receiving a normal mode of operation signal from said subscriber to select said outgoing normal greeting for playback to said caller, and operable in response to receiving a priority call mode of operation signal from the subscriber to select said outgoing priority call greeting for playback to all callers who can then direct said controller to override said call block mode of operation, make the caller's call into a priority call and enable said priority call to be routed to the called phone of said subscriber.

2. The apparatus of claim 1, wherein said network includes a packet switch network.

3. The apparatus of claim 1, wherein said router is facilitated at a mobile switching center (MSC) of a cellular network.

4. The apparatus of claim 2, wherein said subscriber telephone comprises one of a cellular telephone and computer having voice-over IP capabilities.

5. The apparatus of claim 1, wherein said controller is further operable to monitor calls to said subscriber that go unanswered for a predetermined metric, and select the normal greeting to instruct the caller to leave an incoming message for the subscriber.

6. An apparatus for prioritizing incoming telephone calls for subscribers of a carrier providing telephone service over a network, comprising:

a. a router for routing packetized telephone calls over the network, b. a voice mail system communicating with said router (i) for storing incoming messages from callers to a phone of a subscriber, wherein said subscriber's phone includes a call alert device, and (ii) for storing outgoing greetings from the subscriber to be played to all callers to said subscriber, said outgoing greetings including a normal greeting instructing how to leave a message and a "priority call" greeting; and c. a controller communicating with said router and said voice mail system, said controller operable to direct said voice mail system to operate in (i) call block mode to intercept incoming calls and record callers' messages, or (ii) call priority mode to allow all callers to override said call block mode and activate the call alert device on a phone of the subscriber, d. said controller operable in response to receiving a normal mode of operation signal from said subscriber to select said outgoing normal greeting for playback to said caller, and operable in response to receiving a priority call mode of operation signal from the subscriber to select said outgoing priority call greeting for playback to said caller who can then direct said controller to override said call block mode of operation, make his call into a priority call and enable said priority call to be routed to the called phone of said subscriber.

7. A mobile station combined with an apparatus according to claim 1 for prioritizing incoming telephone calls, said mobile station comprising:

a. a memory for storing information associated with said normal and call prioritizing modes of operation and for storing a normal greeting and a call priority greeting respectively;

b. a selector adapted for selecting each of said modes of operation by a subscriber; and c. a transmitter for transmitting to said mobile station said outgoing priority greeting in response to selection of said call prioritizing mode of operation.

8. A telephone answering system comprising:
  a. a telephone answering and recording device (TAD) operatively connectible to a telephone network and adapted to intercept telephone calls from any caller to a the phone of a called party and to record a message from said caller, wherein said subscriber's phone includes a call alert device, said TAD having an outgoing message with instructions conveyed to said calling party to select: option (i) for recording a message for the called party, or option (ii) for overriding and thereby immediately bypassing said TAD and activating the call alert device of the called party's phone,
  b. said TAD, when it intercepts a call, playing said outgoing message to every caller, without qualifying said caller to receive said outgoing message, with said optional instructions: (i) for recording a message for the called party, or (ii) for overriding and immediately bypassing said TAD and activating the call alert device of the called party's phone, and
  c. in response to the caller following said instruction of option (ii), said TAD causing said call to bypass said TAD and to activate the call alert device of said phone of said called party and to connect to said phone if it is answered.

9. A method for prioritizing incoming telephone calls to a subscriber of a carrier providing telephone service over a network where a telephone answering device (TAD) is directed by said subscriber to intercept incoming calls and to record messages left by callers, comprising:
  a. receiving an instruction signal to said TAD from said subscriber to activate a call prioritizing feature in said TAD,
  b. in response to receiving said signal, providing an outgoing priority call message for playback to every caller without qualifying said caller to receive said message, said priority call message providing instructions for said any caller to exercise either option (i) to have the TAD record a message from the calling party, or option (ii) to override and thereby bypass said TAD and activate a call alert device of a subscriber's phone,
  c. receiving from said caller an option (ii) signal for making a current call a priority call, and thereafter
  d. routing said priority call to said subscriber's phone and causing the call alert device of the phone to alert the subscriber of the incoming priority call.

10. The method of claim 9, wherein said receiving a signal associated with the call blocking feature comprises, receiving a packetized signal from a telephone of the subscriber.

11. The method of claim 9, wherein said priority call message further comprises at least one of an instruction how to leave a message in voice mail and an instruction how to terminate the current call.

12. The method of claim 9, wherein said routing a priority call from a caller to the subscriber comprises:
  monitoring whether said routed priority call to said subscriber is unanswered by said subscriber, and if so, selecting a normal outgoing greeting message for playback to the caller after a predetermined metric that the call continues in an unanswered state.

13. The method of claim 9, further comprising storing an incoming message from the caller for playback by the subscriber at a later time.

14. The method of claim 9, wherein said routing a priority call from a caller to the subscriber over the network comprises routing said priority call over one of a cellular telephone network and a packet switched network.

15. The method of claim 9, further comprising:
  a. providing an outgoing greeting message for playback to callers to a subscriber in response to receiving a signal associated with normal telephone operation from said subscriber, said outgoing greeting message providing instructions for leaving a message for the subscriber; and
  b. recording a caller message in response to an incoming call from a caller being routed to the subscriber and going unanswered after a predetermined metric.

* * * * *